United States Patent
Yamamoto et al.

[11] Patent Number: 5,976,728
[45] Date of Patent: Nov. 2, 1999

[54] BATTERY

[75] Inventors: Kenji Yamamoto, Neyagawa; Yasuhiko Shoji, Higashiosaka; Tomotaka Kawano, Yawata; Takayuki Aoi, Hirakata, all of Japan

[73] Assignee: Matsushita Electric Industrial Co., Ltd., Osaka, Japan

[21] Appl. No.: 08/947,860

[22] Filed: Oct. 9, 1997

[30] Foreign Application Priority Data

Nov. 5, 1996 [JP] Japan .................................. 8-292330

[51] Int. Cl.⁶ ........................................................ H01M 2/12
[52] U.S. Cl. ................................................. 429/54; 429/72
[58] Field of Search ................................ 429/56, 55, 54, 429/53, 72

[56] References Cited

U.S. PATENT DOCUMENTS

| | | | |
|---|---|---|---|
| 3,219,488 | 11/1965 | Southworth, Jr. | 429/56 |
| 3,314,824 | 4/1967 | Spanur | 429/56 |
| 3,503,811 | 3/1970 | Urry | 429/54 |
| 3,787,243 | 1/1974 | Zaleski . | |
| 3,884,722 | 5/1975 | Tucholski | 136/102 |
| 4,191,806 | 3/1980 | Levy | 429/56 |
| 4,227,701 | 10/1980 | Tsuchida et al. . | |
| 4,237,203 | 12/1980 | Tsuchida et al. | 429/56 X |
| 4,774,155 | 9/1988 | Nientiedt et al. | 429/56 |
| 5,227,261 | 7/1993 | Georgopoulos | 429/56 |
| 5,279,907 | 1/1994 | Paterek et al. | 429/56 |

FOREIGN PATENT DOCUMENTS

| | | |
|---|---|---|
| 59-98452 | 6/1984 | Japan . |
| 56-103862 | 8/1991 | Japan . |
| 4259749 | 9/1992 | Japan . |
| 0877986 | 3/1996 | Japan . |
| 2058440 | 4/1991 | United Kingdom . |

OTHER PUBLICATIONS

Patent Abstracts of Japan—JP 08–293293 A (Mitsubishi Cable Ind Ltd) Nov. 5, 1996.
JP 02–117063 A (Hitachi Maxell Ltd) May 1, 1990—Abstract.

*Primary Examiner*—Stephen Kalafut
*Attorney, Agent, or Firm*—Stevens, Davis, Miller & Mosher, L.L.P.

[57] ABSTRACT

A battery includes a pair of an anode electric power generating source element and a cathode electric power generating source element for generating an electric power, and a container receiving therein the electric power generating source elements. The container includes a breakable portion which is breakable such that a gas from at least a part of the electric power generating source elements is allowed to flow out of the container therethrough when a pressure in the container increases excessively. The battery further includes a variable throttle for the gas which is elastically deformable by the pressure in the container such that the gas is allowed to flow out of the container.

12 Claims, 3 Drawing Sheets

# BATTERY

BACKGROUND OF THE INVENTION AND RELATED ART STATEMENT

The present invention relates to a battery including a gas discharge mechanism for releasing an excessively increased inner pressure, particularly preferable for an alkaline battery.

In an alkaline battery disclosed by JP-A-59-98452, a breakable portion of a sealing member is broken by an excessively increased inner pressure of the battery so that a gas generated in an inside of the battery by an erroneous use of the battery is discharged from the sealing member to an outside of the battery through a gas discharge port formed on an anode end plate, and the excessively increased inner pressure is released.

OBJECT AND SUMMARY OF THE INVENTION

An object of the present invention is to provide a battery which restrains securely a fluidal discharge or scattering from the battery.

In a battery comprising, a pair of an anode electric power generating source element and a-cathode electric power generating source element for generating an electric power, and a container receiving therein the electric power generating source elements and including a breakable portion which is breakable in such a manner that a gas from at least a part of the electric power generating source elements is allowed to flow out of the container therethrough when a pressure in the container increases excessively. According to the present invention, the battery further comprises a variable throttle for the gas which is elastically deformable by the pressure in the container in such a manner that the gas is allowed to flow out of the container.

Since the variable throttle is elastically deformable by the pressure in the container in such a manner that the gas is allowed to flow out of the container, a restraint against the gas flow from the breakable portion by the variable throttle is changed elastically according to the pressure. Therefore, the fluidal discharge or scattering from the battery is restrained securely or prevented even after the breakable portion is broken.

It is preferable for the variable throttle to return to a substantially-closed position thereof when the pressure decreases to a predetermined degree, for securely preventing the fluidal discharge or scattering from the battery after the pressure decreases or returns to the predetermined degree.

For further improving the restraint against the gas flow from the breakable portion, the battery may comprise further a supplemental throttle for the gas between the breakable portion and the variable throttle. An opening degree of the supplemental throttle may be substantially fixed. If a space is formed between the supplemental throttle and the variable throttle, the gas flow from the breakable portion is absorbed in the space to be decelerated after being decelerated by the supplemental throttle, so that the gas flow from the breakable portion decelerated by both of the supplemental throttle and the space is applied to the variable throttle to be further decelerated by the variable throttle. The space may be formed between the supplemental throttle and the breakable portion for further decelerating the gas flow from the breakable portion. The supplemental throttle and the variable throttle may be closely adjacent to each other.

If a space is formed between the breakable portion and the variable throttle, the gas flow from the breakable portion is absorbed in the space to be decelerated after being decelerated by the breakable portion, so that the gas flow from the breakable portion decelerated by both of the breakable portion and the space is applied to the variable throttle to be further decelerated by the variable throttle.

The variable throttle may have a substantially annular shape. The battery may comprise a substantially cylindrical surface and a substantially annular member around the substantially cylindrical surface to form the variable throttle therebetween. The substantially annular member may be elastic. The substantially annular ember may have notches facing to the substantially cylindrical surface and spaced apart from each other in a circumferential direction, so that a buckling of the annular member is restrained or prevented. The battery may comprise an elastic member receiving the pressure to be deformed elastically by the pressure, so that a flow-allowance degree of the elastic member for the gas is changed in accordance with the pressure to form the variable throttle.

The container may comprise an anode terminal plate, a container body and an elastomer member, so that the variable throttle is formed on the elastomer member through which the anode terminal plate is fixed to the container body. The anode terminal plate and the elastomer member may form the variable throttle there-between. The breakable portion may be formed on the elastomer member. The variable throttle may be arranged at a radial inside of the battery relative to a contact area between the elastomer member and the container body. The variable throttle may be arranged at a radial inside of the battery relative to a contact area between the elastomer member and the anode terminal plate. The anode terminal plate may include the supplemental throttle for the gas between the breakable portion and the variable throttle. The elastomer member may comprise a substantially-cantilever-shaped portion extending from a contact area between the elastomer member and the container body, and receiving the pressure.

When the container has an elastic member extending at least partially as a cantilever to form the variable throttle, it is preferable that the elastic member has a terminating end and a root portion on which a part of the elastic member including the terminating end swings elastically, and a thickness of the part of the elastic member between the terminating end and the root portion is larger than a thickness of the root portion of the elastic member in a flow direction of the gas, for preventing or restraining a buckling of the cantilever-shaped part of the elastic member.

When a battery comprises a pair of an anode electric power generating source element and a cathode electric power generating source element for generating an electric power, a container body receiving therein the electric power generating source elements, and including an opening, an anode terminal plate arranged in the opening and including at least one discharge port, and an elastomer sealing member arranged between the container body and the anode terminal plate and including a breakable portion which is breakable in such a manner that a gas from at least a part of the electric power generating source elements is allowed to flow to the discharge port therethrough when a pressure in the container body increases excessively, it is preferable for restraining securely or preventing the fluidal discharge or scattering from the battery even after the breakable portion is broken that a part of the elastomer sealing member extends as a cantilever over the at least one discharge port so that a flow rate of the gas is adjusted by the elastomer sealing member deformed elastically according to the pressure.

When a thickness of the part of the elastomer sealing member is smaller than that of another part of the elastomer sealing member contacting with the anode terminal plate and the container body, a bending rigidity of the part of the elastomer sealing member is decreased so that the release of the excessive pressure starts at a low pressure degree. Therefore, a scattering or blowing force of the gas is decreased. When the elastomer sealing member has a circular terminating end on the part of the elastomer sealing member and a circular root portion on which the part of the elastomer sealing member swings elastically, and a thickness of the part of the elastomer sealing member between the circular terminating end and the circular root portion is larger than a thickness of the circular root portion of the elastomer sealing member in a flow direction of the gas, a buckling of the part of the elastomer sealing member between the circular terminating end and the circular root portion is restrained or prevented, and the bending or swing rigidity of the part of the elastomer sealing member around the root portion is decreased. The thickness of the circular root portion of the elastomer sealing member is preferably smaller than that of the another part of the elastomer sealing member contacting with the anode terminal plate and the container body so that the bending or swing rigidity of the part of the elastomer sealing member around the root portion is decreased.

DETAILED DESCRIPTION OF PREFERRED EMBODIMENTS

Figure 4:
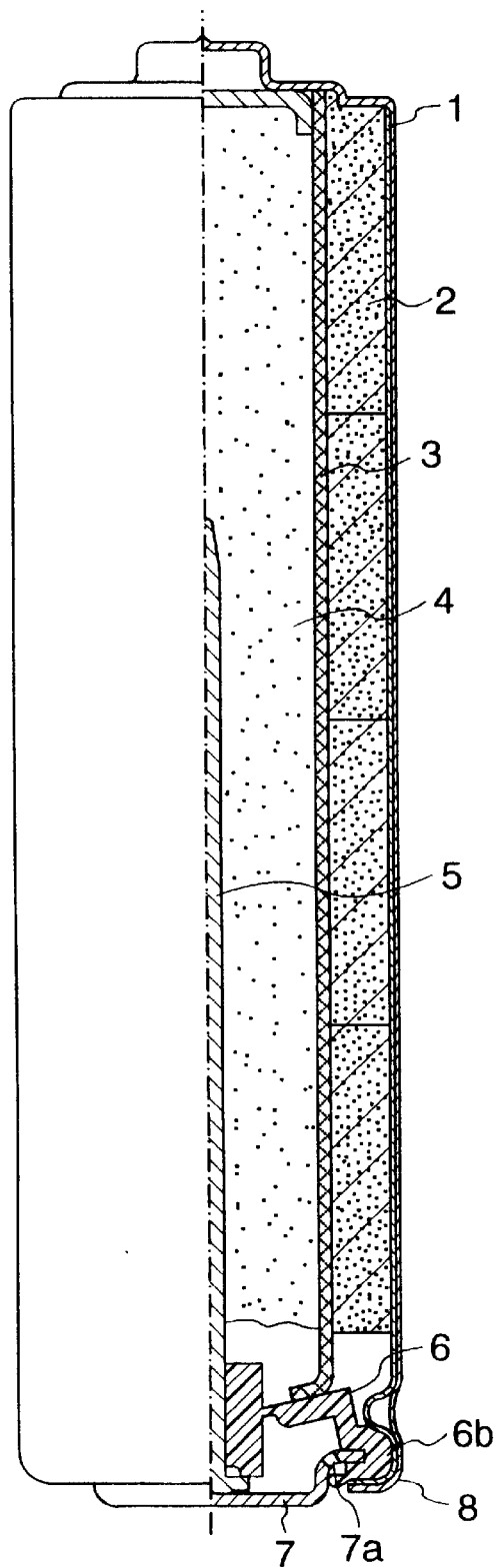
FIG. 4 is a partially cross-sectional view showing a battery including the fifth embodiment.

In battery embodiments of the present invention, as shown by, for example, FIG. 4, an elastomer (for example, 6—6 nylon, polypropylene, soft polyethylene, polyethyleneterephthalate, or the like) member 6, an anode terminal plate 7 and a container body 1 form a battery container receiving therein a cathode electric power generating source element 2 including mainly, for example, manganese dioxide and graphite, and an anode electric power generating source element 4 including, for example, zinc-alloy-powder and alkaline-gel-electrolyte. A cylindrical separator 3 is arranged between the cathode electric power generating source element 2 and the anode electric power generating source element 4, an anode current collector 5 welded to the anode terminal plate 7 extends in the anode electric power generating source element 4 to feed an electric power to the anode terminal plate 7, and a resin cover 8 covers the container body 1.

The elastomer member 6 includes an annular breakable portion 6a of 0.25 mm thickness which is broken to allow a part of the cathode electric power generating source element 2 and the anode electric power generating source element 4 (preferably, only a gas therefrom) to flow out of the container when a pressure in the container increases excessively, and a circular deformed portion 6b of 0.8 mm (preferably 0.6–1.2 mm) thickness pressed against a circular flange 7b of the anode terminal plate 7 with a hermetical sealing by caulking radially a cylindrical end of the container body 1 on the circular deformed portion 6b. The anode terminal plate 7 has at least one (for example, four) discharge port 7a to allow the part of the cathode electric power generating source element 2 and the anode electric power generating source element 4 (preferably, only the gas therefrom) to flow out of the container when the breakable portion 6a is broken.

Figure 1A:
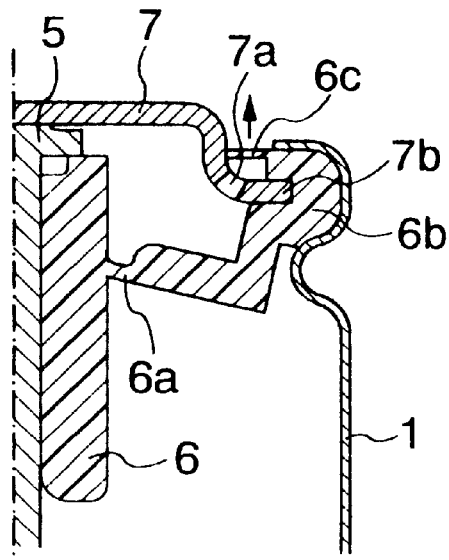
FIG. 1a is a cross-sectional view showing a first embodiment of the present invention.

In a first embodiment as shown in FIG. 1a, the elastomer member 6 has an elastically deformable or swingable annular substantially-constant-thickness portion 6c of 0.3 mm (preferably 0.2–0.4 mm) thickness over the discharge port 7a to form a variable throttle with the anode terminal plate 7. The substantially-constant-thickness portion 6c preferably contacts at least partially the anode terminal plate 7 to close or contract the variable throttle when the excessive pressure in the container is released. A space is formed between the substantially-constant-thickness portion 6c and the discharge port 7a.

Figure 1B:
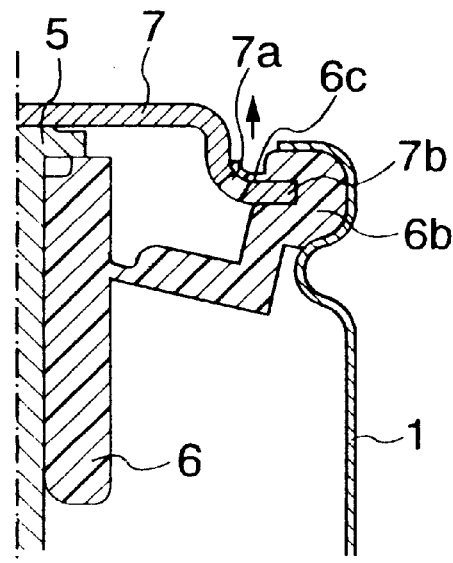
FIG. 1b is a cross-sectional view showing a second embodiment of the present invention.

In a second embodiment as shown in FIG. 1b, the elastomer member 6 has the elastically deformable or swingable annular substantially-constant-thickness portion 6c of 0.3 mm (preferably 0.2–0.4 mm) thickness over the discharge port 7a to form the variable throttle with the anode terminal plate 7. The substantially-constant-thickness portion 6c preferably contacts at least partially the anode terminal plate 7 to close or contract the variable throttle when the excessive pressure in the container is released. A space is not formed between the substantially-constant-thickness portion 6c and the discharge port 7a.

Figure 1C:
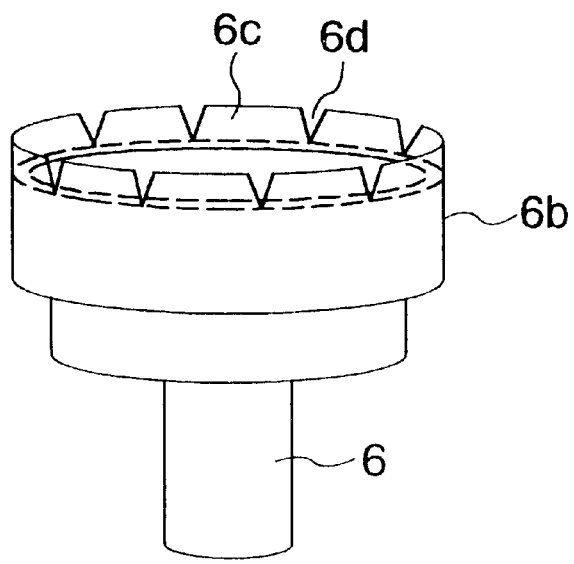
FIG. 1c is a cross-sectional view showing a third embodiment of the present invention.

In a third embodiment as shown in FIG. 1c, the elastically deformable or swingable annular substantially-constant-thickness portion 6c of the first embodiment as shown in FIG. 1c has additionally V-shaped notches 6d to prevent a buckling of the annular substantially-constant-thickness portion 6c caused by being pressed radially against the circular flange 7b. Opposite sides of each of the notches 6d contact each other to restrain a fluidal leakage through the notches 6d.

Figure 2A:
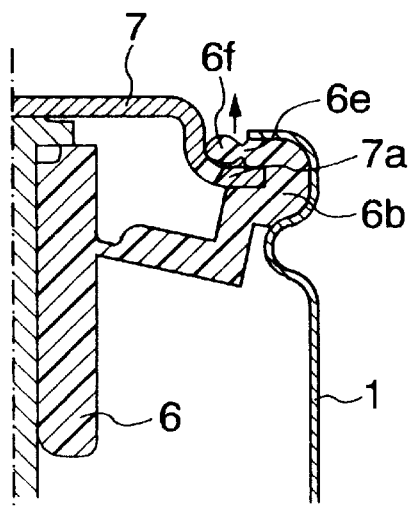
FIG. 2a is a cross-sectional view showing a fourth embodiment of the present invention.

In a fourth embodiment as shown in FIG. 2a, the elastomer member 6 has an elastically deformable or swingable annular relatively-thin portion 6e of 0.3 mm (preferably 0.2–0.4 mm) thickness, and an elastically deformable or swingable annular relatively-thick portion 6f of 0.6 mm (preferably 0.4–0.9 mm) thickness over the discharge port 7a to form the variable throttle with the anode terminal plate 7. A thinness of the annular relatively-thin portion 6e decreases a bending rigidity of the annular relatively-thick portion 6f to keep a softly-elastic bending motion of the annular relatively-thick portion 6f as a root of a cantilever, and a thickness of the annular relatively-thick portion 6f restrains or prevents the buckling of itself. The annular relatively-thick portion 6f preferably contacts at least partially the anode terminal plate 7 to close or contract the variable throttle when the excessive pressure in the container is released. A space is not formed between the annular relatively-thick portion 6f and the discharge port 7a.

Figure 2B:
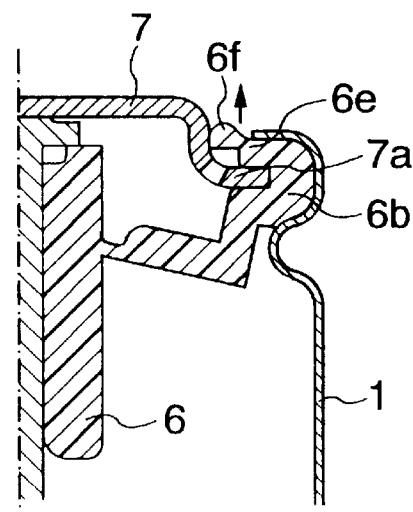
FIG. 2b is a cross-sectional view showing a fifth embodiment of the present invention.

In a fifth embodiment as shown in FIG. 2b, the elastomer member 6 has the elastically deformable or swingable annular relatively-thin portion 6e of 0.3 mm (preferably 0.2–0.4 mm) thickness, and the elastically deformable or swingable annular relatively-thick portion 6f of 0.6 mm (preferably 0.4–0.9 mm) thickness over the discharge port 7a to form the variable throttle with the anode terminal plate 7. A thinness of the annular relatively-thin portion 6e decreases a bending rigidity of the annular relatively-thick portion 6f to keep a softly-elastic bending motion of the annular relatively-thick portion 6f as a root of a cantilever, and a thickness of the annular relatively-thick portion 6f restrains or prevents the buckling of itself. The annular relatively-thick portion 6f preferably contacts at least partially the anode terminal plate 7 to close or contract the variable throttle when the excessive pressure in the container is released. A space is formed between the annular relatively-thick portion 6f and the discharge port 7a.

Figure 3A:
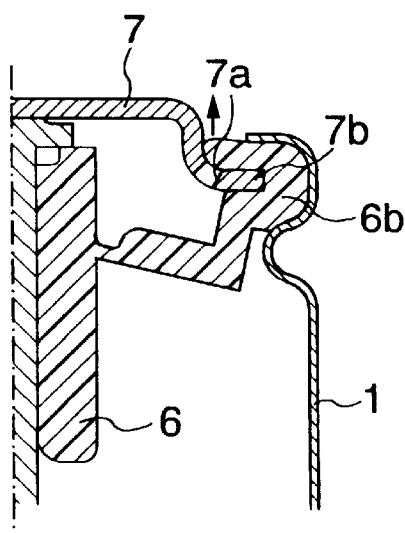
FIG. 3a is a cross-sectional view showing a sixth embodiment of the present invention.

In a sixth embodiment as shown in FIG. 3a, the elastomer member 6 has an elastically deformable or swingable annular relatively-thick portion extending from the circular deformed portion 6b with a constant thickness therebetween over the discharge port 7a to form the variable throttle with the anode terminal plate 7. The annular relatively-thick portion 6f preferably contacts at least partially the anode terminal plate 7 to close or contract the variable throttle when the excessive pressure in the container is released. A space is not formed between the annular relatively-thick portion 6f and the discharge port 7a.

Figure 3B:
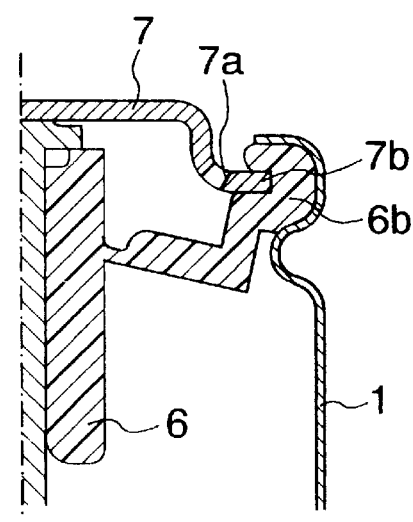
FIG. 3b is a cross-sectional view showing a test sample of a battery.

In a prior art sample as shown in FIG. 3b, the elastomer member 6 has no elastic annular portion extending from the circular deformed portion 6b over the discharge port 7a, so that the variable throttle is not formed.

A result of an experiment in which the above six embodiments and the prior art sample are applied to LR6-type alkaline batteries is shown below. For increasing excessively the pressure in the battery container to break the breakable portion, each of the test batteries is electrically charged by three batteries of the same type with a load resistance of 10 Ω. An improvement of each of the test batteries is measured from a restraining performance for a scattering length of the part of the electric power generating source elements from the each of the test batteries.

TABLE 1

| | SCATTERING LENGTH | | | |
|---|---|---|---|---|
| | LESS THAN 5 cm | 5–10 cm | 11–30 cm | MORE THAN 30 cm |
| FIRST EMBODIMENT | 20/20 | 0/20 | 0/20 | 0/20 |
| SECOND EMBODIMENT | 16/20 | 4/20 | 0/20 | 0/20 |
| THIRD EMBODIMENT | 20/20 | 0/20 | 0/20 | 0/20 |
| FOURTH EMBODIMENT | 14/20 | 6/20 | 0/20 | 0/20 |
| FIFTH EMBODIMENT | 20/20 | 0/20 | 0/20 | 0/20 |
| SIXTH EMBODIMENT | 0/20 | 0/20 | 12/20 | 8/20 |
| PRIOR-ART SAMPLE | 0/20 | 0/20 | 0/20 | 20/20 |

What is claimed is:

1. A battery comprising,
   a pair of an anode electric power generating source element and a cathode electric power generating source element for generating electric power;
   a container receiving therein the anode and cathode electric power generating source elements and including a breakable member which is breakable to enable a gas from at least a part of the anode and cathode electric power generating source elements to flow out of the container therethrough when a pressure in the container increases excessively; and
   a variable throttle which is elastically deformable by the pressure in the container to control discharge of the gas from the container, wherein the battery comprises a substantially cylindrical surface and an elastic substantially annular member disposed around the substantially cylindrical surface to form the variable throttle between the substantially cylindrical surface and the substantially annular member, and wherein the substantially annular member has notches which face the substantially cylindrical surface and which are spaced apart from each other in a circumferential direction.

2. A battery comprising,
   a pair of an anode electric power generating source element and a cathode electric power generating source element for generating electric power; and
   a container receiving therein the anode and cathode electric power generating source elements and including a breakable member which is breakable responsive to a high pressure in the container to enable a gas from at least a part of the anode and cathode electric power generating source elements to flow out of the container therethrough; and
   a variable throttle which is elastically deformable by the pressure in the container such that the gas is allowed to be discharged from the container at a variable rate in accordance with variations in the pressure in the container, wherein the container comprises an anode terminal plate, a container body and an elastomer member, the variable throttle is a part of the elastomer member and the anode terminal plate is fixed to the container body through the elastomer member.

3. A battery according to claim 2, wherein the anode terminal plate and the elastomer member form the variable throttle therebetween.

4. A battery according to claim 2, wherein the breakable member is a part of the elastomer member.

5. A battery according to claim 2, wherein the variable throttle is arranged at a radial inside of the battery relative to a contact area between the elastomer member and the container body.

6. A battery according to claim 2, wherein the variable throttle is arranged at a radial inside of the battery relative to a contact area between the elastomer member and the anode terminal plate.

7. A battery according to claim 2, wherein the anode terminal plate includes a supplemental throttle for the gas, said supplemental throttle being disposed between the breakable portion and the variable throttle.

8. A battery according to claim 2, wherein the breakable member of the elastomer member comprises a substantially-cantilever-shaped portion extending from a contact area between the elastomer member and the container body, and receiving the pressure.

9. A battery comprising:
   a pair of an anode electric power generating source element and a cathode electric power generating source element for generating an electric power,
   a container body receiving therein the anode and cathode electric power generating source elements, and including an opening,
   an anode terminal plate arranged in the opening and including at least one discharge port, and an elastomer sealing member arranged between the container body and the anode terminal plate and including a breakable member which is breakable responsive to a high pressure in the container body to enable a gas from a least a part of the anode and cathode electric power generating source elements to flow to the discharge port through the elastomer sealing member, wherein a part of the elastomer sealing member extends as a cantilever over the at least one discharge port so that a flow rate of the gas is adjusted in response to the elastomer sealing member being deformed elastically according to the level of the pressure in the container body.

10. A battery according to claim 9, wherein a thickness of said part of the elastomer sealing member is smaller than that of another part of the elastomer sealing member contacting with the anode terminal plate and the container body.

11. A battery according to claim 9, wherein the elastomer sealing member has a circular terminating end on said part of the elastomer sealing member and a circular root portion on which said part of the elastomer sealing member swings elastically, and a thickness of said part of the elastomer sealing member between the circular terminating end and the circular root portion is larger than a thickness of the circular root portion of the elastomer sealing member in a flow direction of the gas.

12. A battery according to claim 9, wherein said part of the elastomer sealing member and the at least one discharge port are disposed to form a space therebetween.

* * * * *